(12) United States Patent
Liang et al.

(10) Patent No.: US 10,910,652 B2
(45) Date of Patent: *Feb. 2, 2021

(54) CURRENT COLLECTOR, ELECTRODE PLATE INCLUDING THE SAME AND ELECTROCHEMICAL DEVICE

(71) Applicant: CONTEMPORARY AMPEREX TECHNOLOGY CO., LIMITED, Ningde (CN)

(72) Inventors: Chengdu Liang, Ningde (CN); Xin Liu, Ningde (CN); Zuyu Wu, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,459

(22) Filed: Dec. 4, 2018

(65) Prior Publication Data

US 2019/0173090 A1 Jun. 6, 2019

(30) Foreign Application Priority Data

Dec. 5, 2017 (CN) .......................... 2017 1 1268372

(51) Int. Cl.
*H01M 4/66* (2006.01)
*H01M 10/0525* (2010.01)
(Continued)

(52) U.S. Cl.
CPC ........... *H01M 4/661* (2013.01); *H01M 4/667* (2013.01); *H01M 4/668* (2013.01); *H01M 4/75* (2013.01);
(Continued)

(58) Field of Classification Search
None
See application file for complete search history.

(56) References Cited

U.S. PATENT DOCUMENTS 8,399,113 B2* 3/2013 Nakura ................ H01M 2/348
429/163
2005/0221190 A1 10/2005 Sudano et al.
(Continued)

FOREIGN PATENT DOCUMENTS

| CN | 106981665 A | 7/2017 |
| CN | 107123812 A | 9/2017 |

(Continued)

OTHER PUBLICATIONS

Technical Data Sheet for Polyvinylidene Rod and Sheet, Symalit® 1000 PVDF, theplasticshop.co.uk®, Published Apr. 24, 2011, https://www.theplasticshop.co.uk/plastic_technical_data_sheets/pvdf_technical_data_sheet.pdf . (Year: 2011).*

(Continued)

*Primary Examiner* — Rena Dye Cronin
(74) *Attorney, Agent, or Firm* — Tucker Ellis LLP

(57) ABSTRACT

A current collector, an electrode plate, and an electrochemical device are provided in the present disclosure. The current collector includes an insulation layer and at least one conductive layer. The insulation layer is used to support the conductive layer. The at least one conductive layer is used to support an electrode active material layer and is located above at least one surface of the insulation layer. The insulation layer has a density smaller than that of the conductive layer. A metal protective layer is arranged on at least one surface of each of the at least one conductive layer.

15 Claims, 4 Drawing Sheets

(51) Int. Cl.
  *H01M 4/02*  (2006.01)
  *H01M 4/75*  (2006.01)
(52) U.S. Cl.
  CPC .. *H01M 10/0525* (2013.01); *H01M 2004/027* (2013.01); *H01M 2004/028* (2013.01)

(56) References Cited

U.S. PATENT DOCUMENTS

| | | | | |
|---|---|---|---|---|
| 2011/0052985 | A1* | 3/2011 | Kashiwazaki | H01G 11/38 |
| | | | | 429/217 |
| 2012/0052378 | A1* | 3/2012 | Torata | H01M 4/13 |
| | | | | 429/209 |
| 2013/0017441 | A1* | 1/2013 | Affinito | H01M 2/1673 |
| | | | | 429/211 |
| 2017/0309951 | A1* | 10/2017 | Ishikawa | H01M 2/34 |
| 2018/0301709 | A1* | 10/2018 | Qiu | C23C 14/568 |

FOREIGN PATENT DOCUMENTS

| | | |
|---|---|---|
| CN | 107369810 A | 11/2017 |
| CN | 206849947 U | 1/2018 |
| EP | 3389122 A1 | 10/2018 |
| JP | 2003282064 A | 10/2003 |
| JP | 2008207404 A | 9/2008 |
| JP | 2012104248 A | 5/2012 |
| JP | 2014220187 A | 11/2014 |
| WO | 2016158927 A1 | 4/2017 |

OTHER PUBLICATIONS

Density of Elements of the Periodic Table, Science Notes Learn Science Do Science, Jun. 27, 2017, https://sciencenotes.org/density-elements-periodic-table/. (Year: 2017).*

Office Action from corresponding Japanese Application No. 2018153410, dated Jul. 16, 2019, 6 pages.

Office Action (Communication Pursuant to Article 94(3) EPC) from corresponding European Application No. 18191622.2, dated Apr. 24, 2019, 5 pages.

European Search Report from corresponding European Application No. 18191622.2, dated Dec. 11, 2018, 4 pages.

Anonymous: "Comparative data for plastic films" Mitsubishi Polyester Film GmbH, Nov. 19, 2019; Retrieved from the Internet: URL: https://www.m-pethlm.de/en/service/comparative-date-for-plastic-films/ [retrieved on Nov. 20, 2019].

U.S. General Services Administration: "Summary report on real property owned by the United States throughout the world", Jan. 1, 1974; Retrieved from the Internet: URL https://www.dupont.com/content/dam/dupont/products-and-services/membranes-and-films/polyimde-films/documents/DEC-Kapton-summary-of-properties.pdf.

European Office Action (Communication Pursuant to Article 94(3) EPC) for corresponding European Patent Application No. 18191622.2, dated Nov. 26, 2019, 7 pages.

Okouchi, Mio, "Dictionary of Metallic Materials," Japan, Engineering Books Co., Ltd., 9th Ed., Feb. 20, 1978, 6 pages with translation.

* cited by examiner

CURRENT COLLECTOR, ELECTRODE PLATE INCLUDING THE SAME AND ELECTROCHEMICAL DEVICE

CROSS-REFERENCE TO RELATED DISCLOSURES

The present disclosure claims priority to Chinese Patent Disclosure No. 201711268372.2, filed on Dec. 5, 2017, the content of which is incorporated herein by reference in its entirety.

TECHNICAL FIELD

The present disclosure relates to the field of energy storage materials and, in particular, relates to a current collector, an electrode plate including the current collector, and an electrochemical device.

BACKGROUND

Lithium ion batteries have been widely used in electric vehicles and consumer electronics due to their advantages such as high energy density, high output power, long cycle life, and low environmental pollution. With continuous increasing of the application range of lithium ion batteries, requirements for weight energy density and volume energy density of lithium ion batteries are also increasing.

In order to obtain a lithium ion battery with the high weight energy density and volume energy density, the lithium ion battery is generally improved by: (1) selecting a positive or negative electrode material having a high specific discharge capacity; (2) optimizing the mechanical design of the lithium ion battery to minimize its volume; (3) selecting a positive or negative electrode plate having the high compaction density; and (4) reducing weight of various parts of the lithium ion battery.

The current collector is generally improved by selecting a lighter or thinner current collector such as a punched current collector or a plastic current collector coated with a metal layer, etc.

For the plastic current collector coated with a metal layer, improvements on many aspects are needed so as to obtain a current collector with good conductivity, a light weight, and a small thickness.

In view of this, the present disclosure is proposed.

SUMMARY

The present disclosure provides a current collector, an electrode plate including the current collector, and an electrochemical device.

In a first aspect of the present disclosure, a current collector is provided. The current collector includes: an insulation layer and at least one conductive layer. The insulation layer is used to support the conductive layer. The at least one conductive layer is used to support an electrode active material layer and is located above at least one surface of the insulation layer. The insulation layer has a density smaller than a density of the conductive layer. A metal protective layer is arranged on at least one surface of each of the at least one conductive layer.

In a second aspect of the present disclosure, an electrode plate is provided. The electrode plate includes: a current collector according to the first aspect of the present disclosure and an electrode active material layer formed on a surface of the current collector.

In a third aspect of the present disclosure, an electrochemical device is provided. The electrochemical device includes: a positive electrode plate, a separator, and a negative electrode plate. The positive electrode plate and/or the negative electrode plate is the electrode plate according to the second aspect of the present disclosure.

The technical solution of the present disclosure has at least the following beneficial effects.

The current collector of the present disclosure is light relative to a conventional current collector, so that the weight energy density of the battery can be significantly increased, thereby obtaining a light-weight current collector.

The light-weight current collector of the present disclosure is provided with a metal protective layer on the conductive layer, so that the mechanical strength of the current collector is further improved, and the conductive layer is also prevented from being oxidized, corroded or damaged, thus ensuring that the current collector has a good mechanical stability, an operating stability and a service life. Meanwhile, because the protective layer is made of metal, it has good conductivity so that the battery has a good rate performance.

The electrode plates and the electrochemical device according to the present disclosure not only have a higher weight energy density and a higher volume energy density, but also have good electrochemical performance such as rate performance, cycle performance, etc., and at the same time have excellent operating stability and service life.

in which:
1—positive electrode plate;
10—positive current collector;
101—positive insulation layer,
102—positive conductive layer;
103—positive protective layer;
11—positive active material layer;
2—negative electrode plate
20—negative current collector,
201—negative insulation layer,
202—negative conductive layer;
203—negative protective layer;
21—negative active material layer.

DESCRIPTION OF EMBODIMENTS

Hereafter, the present disclosure will be further described in combination with specific embodiments. It should be understood that these embodiments are only for illustrating the present disclosure and do not limit the scope of the present disclosure.

Embodiments of the present disclosure provides a current collector including an insulation layer and at least one conductive layer. The insulation layer is used to support the conductive layer, and the conductive layer is used to support an electrode active material layer and located above at least one surface of the insulation layer. A metal protective layer is arranged on at least one surface of the conductive layer.

The current collector of the present disclosure includes an insulation layer and at least one conductive layer. Since the insulation layer is generally made of an organic material and the conductive layer is generally made of a denser metal or other conductive material, the density of the insulation layer is smaller than that of the conductive layer, i.e., the weight energy density has been improved with compared to the conventional current collectors such as an aluminum foil or a copper foil. The thinner the conductive layer is, the greater the increase in the weight density of the current collector will be. Therefore, a metal protective layer is further arranged on at least one surface of the conductive layer, thus improving the mechanical strength of the current collector as a whole. This can also effectively prevent the conductive layer from being destroyed oxidized or corroded, etc., and significantly improve an operating stability and a service life of the current collector.

FIGS. 1 to 12 are structural schematic diagrams of current collectors according to the embodiments of the present disclosure. FIGS. 1 to 6 are structural schematic diagrams of positive current collectors according to the embodiments of the present disclosure.

Figure 1:
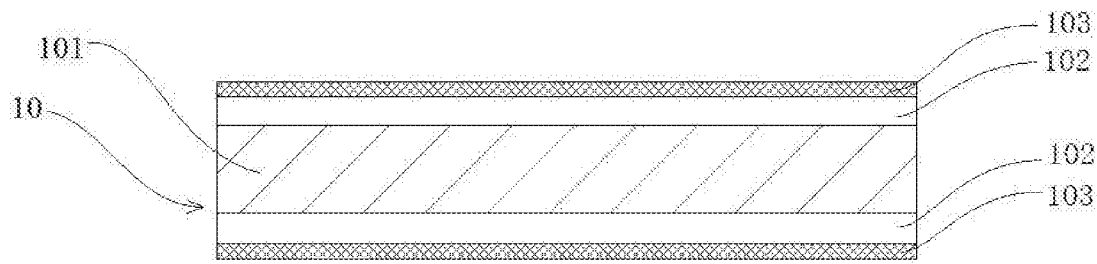
FIG. 1 is a structural schematic diagram of a positive current collector according to an embodiment of the present disclosure.

In FIG. 1, the positive current collector 10 includes a positive insulation layer 101 and two positive conductive layers 102 arranged above two opposite surfaces of the positive insulation layer 101. A protective layer 103 is provided on a surface of each positive conductive layer 102 facing away from the positive insulation layer 101.

Figure 2:
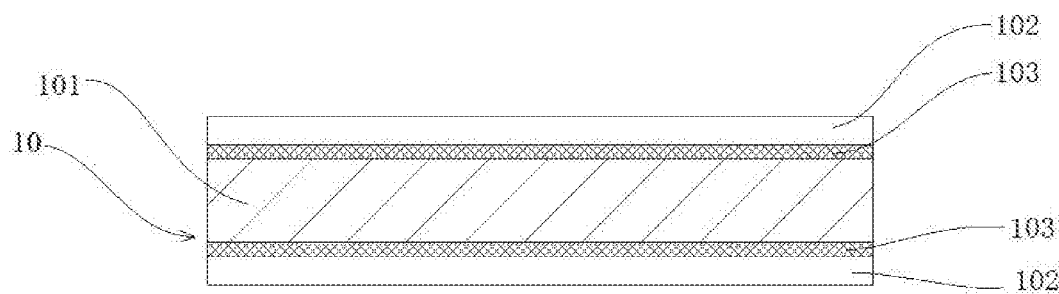
FIG. 2 is a structural schematic diagram of a positive current collector according to another embodiment of the present disclosure.

In FIG. 2, the positive current collector 10 includes a positive insulation layer 101 and two positive conductive layers 102 arranged above two opposite surfaces of the positive insulation layer 101. A protective layer 103 is provided on the lower surface of each positive conductive layer 102 (i.e., the surface facing towards the positive insulation layer 101).

Figure 3:
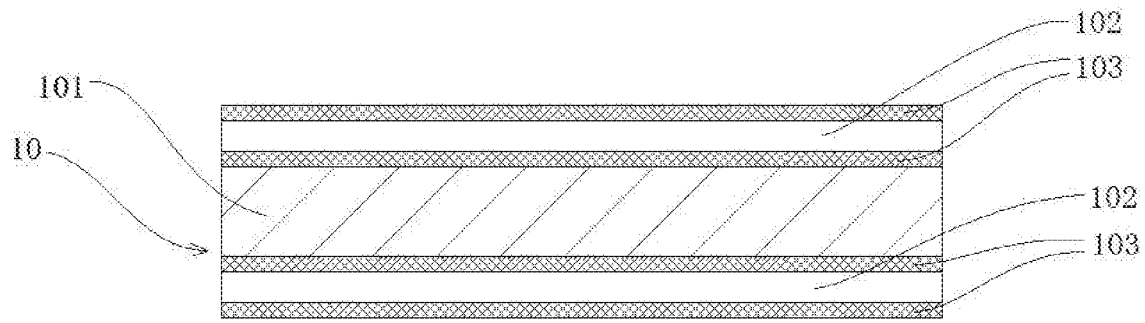
FIG. 3 is a structural schematic diagram of a positive current collector according to another embodiment of the present disclosure.

In FIG. 3, the positive current collector 10 includes a positive insulation layer 101 and two positive conductive layers 102 arranged above two opposite surfaces of the positive insulation layer 101. Two protective layers 103 are provided on two opposite surfaces of each positive conductive layer 102.

Figure 4:
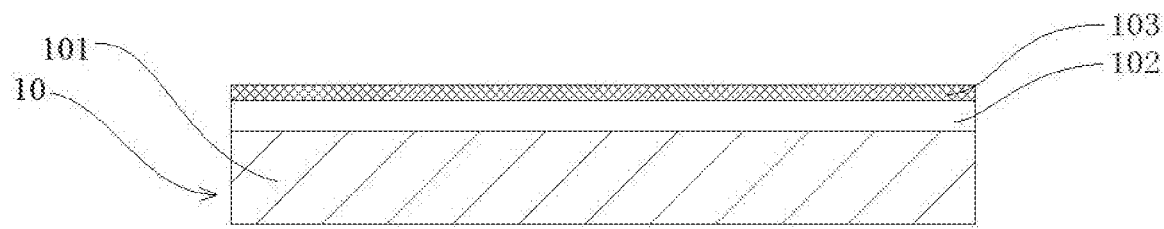
FIG. 4 is a structural schematic diagram of a positive current collector according to another embodiment of the present disclosure.

In FIG. 4, the positive current collector 10 includes a positive insulation layer 101 and a positive conductive layer 102 arranged above one surface of the positive insulation layer 101. A protective layer 103 is provided on an upper surface of the positive conductive layer 102, i.e., the surface facing away from the positive insulation layer 101.

Figure 5:
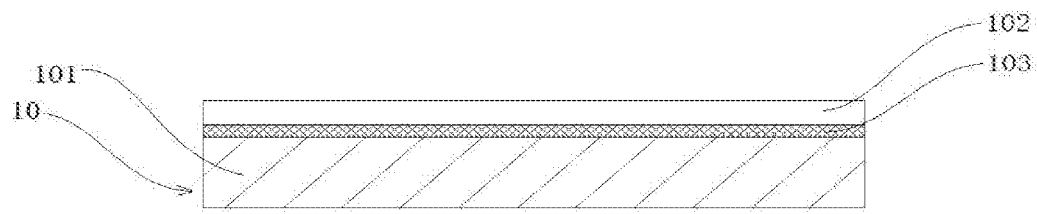
FIG. 5 is a structural schematic diagram of a positive current collector according to another embodiment of the present disclosure.

In FIG. 5, the positive current collector 10 includes a positive insulation layer 101 and a positive conductive layer 102 arranged above one surface of the positive insulation layer 101. A protective layer 103 is provided on a lower surface of the positive conductive layer 102, i.e., the surface facing towards the positive insulation layer 101.

Figure 6:
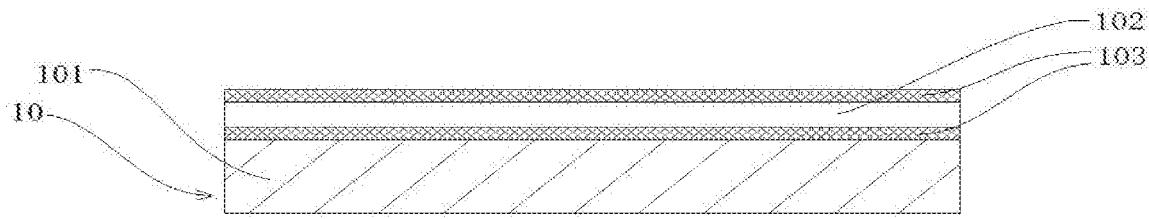
FIG. 6 is a structural schematic diagram of a positive current collector according to another embodiment of the present disclosure.

In FIG. 6, the positive current collector 10 includes a positive insulation layer 101 and a positive conductive layer 102 arranged above one surface of the positive insulation layer. Two protective layers 103 are provided on two opposite surfaces of the positive conductive layer 102.

FIGS. 7 to 12 are structural schematic diagrams of negative current collectors according to the embodiments of the present disclosure.

Figure 7:
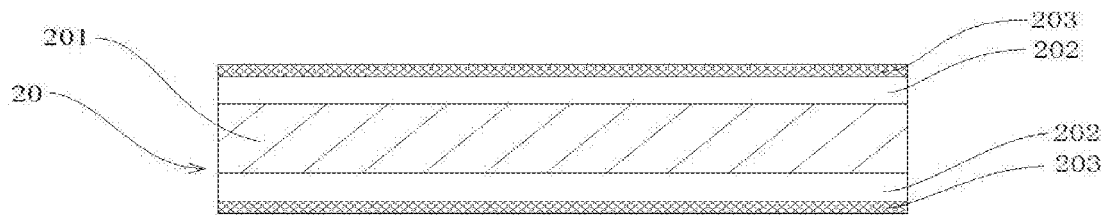
FIG. 7 is a structural schematic diagram of a negative current collector according to an embodiment of the present disclosure.

In FIG. 7, the negative current collector 20 includes a negative insulation layer 201 and two negative conductive layers 202 arranged above two opposite surfaces of the negative insulation layer 201. A protective layer 203 is provided on a surface of each negative conductive layer 202 facing away from the negative insulation layer 201.

Figure 8:
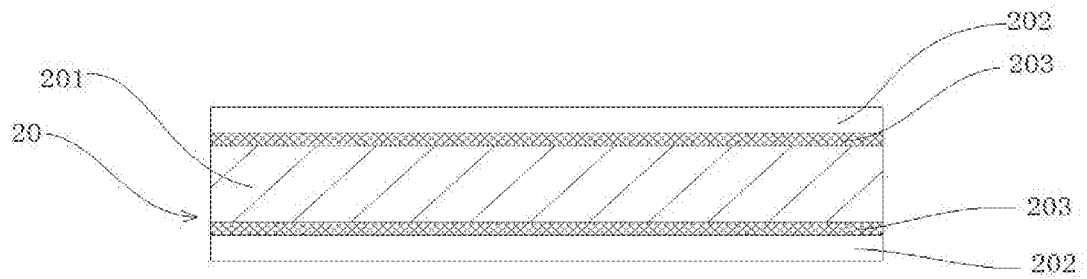
FIG. 8 is a structural schematic diagram of a negative current collector according to another embodiment of the present disclosure.

In FIG. 8, the negative current collector 20 includes a negative insulation layer 201 and two negative conductive layer 202 arranged above two opposite surfaces of the negative insulation layer 201. A protective layer 203 is provided on a surface of each negative conductive layer 202 facing towards the negative insulation layer 201.

Figure 9:
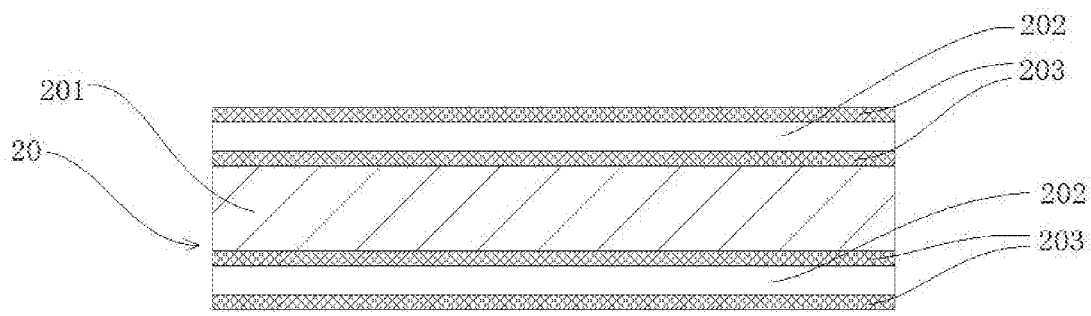
FIG. 9 is a structural schematic diagram of a negative current collector according to another embodiment of the present disclosure.

In FIG. 9, the negative current collector 20 includes a negative insulation layer 201 and two negative conductive layers 202 arranged above two opposite surfaces of the negative insulation layer 201. Two protective layers 203 are provided on two opposite surfaces of each negative conductive layer 202.

Figure 10:
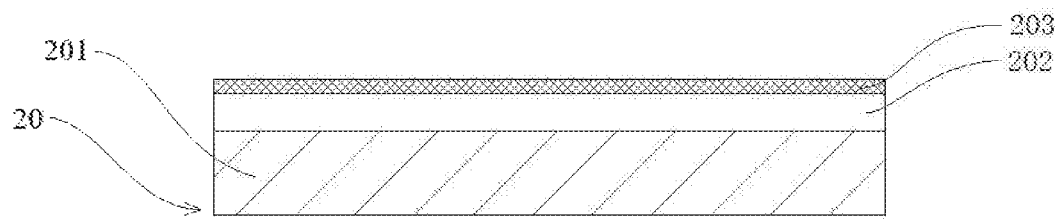
FIG. 10 is a structural schematic diagram of a negative current collector according to another embodiment of the present disclosure.

In FIG. 10, the negative current collector 20 includes a negative insulation layer 201 and a negative conductive layer 202 arranged above one surface of the negative insulation layer 201. A protective layer 203 is provided on an upper surface of the negative conductive layer 202, i.e., the surface facing away from the negative insulation layer 201.

Figure 11:
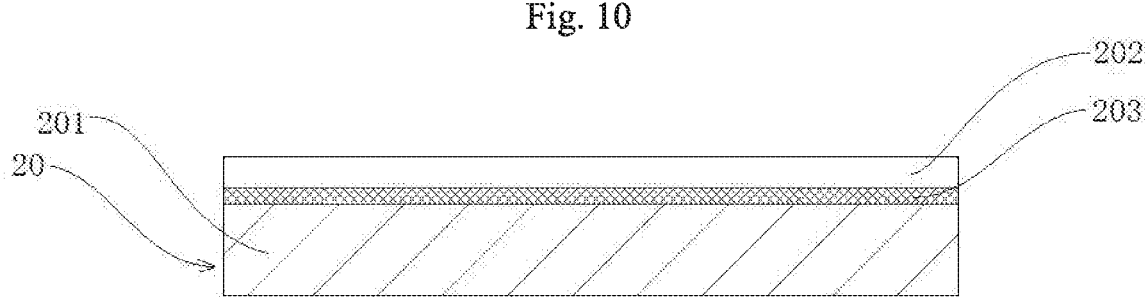
FIG. 11 is a structural schematic diagram of a negative current collector according to another embodiment of the present disclosure.

In FIG. 11, the negative current collector 20 includes a negative insulation layer 201 and a negative conductive layer 202 arranged above one surface of the negative insulation layer 201. A protective layer 203 is provided on a lower surface of the negative conductive layer 202, i.e., the surface facing towards the negative insulation layer 201.

Figure 12:
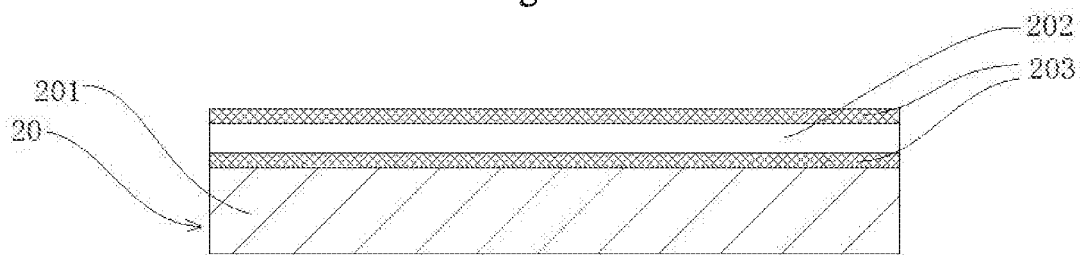
FIG. 12 is a structural schematic diagram of a negative current collector according to another embodiment of the present disclosure.

In FIG. 12, the negative current collector 20 includes a negative insulation layer 201 and a negative conductive layer 202 arranged above one surface of the negative insulation layer 201. Two protective layers 203 are provided on two opposite surfaces of the negative conductive layer 202.

The structures and performances of the current collectors according to the embodiments of the present disclosure will be described in detail below.

[Insulation Layer]

The current collector according to the embodiments of the present disclosure includes an insulation layer and a conductive layer. Compared to the conventional metal current collector, the insulation layer plays a role of supporting and protecting the conductive layer in the current collector of the embodiments of the present disclosure. Since the insulation layer is generally made of an organic insulation material, the density of the insulation layer is smaller than that of the conductive layer so that the weight energy density of the current collector can be significantly increased.

Further, the thickness of the insulation layer is D1, and D1 satisfies: 1 μm≤D1≤10 μm, and the tensile strength of the insulation layer is not smaller than 150 MPa. When the thickness of the insulation layer is reduced, the weight energy density and volume energy density of the battery would be significantly improved. However, if the thickness of the insulation layer is too small, the insulation layer is likely to be broken during the processing process of the electrode plate or the like.

The upper limit of the thickness D1 of the insulation layer may be 10 μm, 9 μm, 8 μm, 7 μm, or 6 μm, and the lower limit of the thickness D1 of the conductive layer may be 1 μm, 1.5 μm, 2 μm, 3 μm, 4 μm, or 5 μm. The thickness of the insulation layer D1 can be in a range consisting of any one upper limit and any one lower limit.

In the embodiments of the present disclosure, in order to further guarantee the mechanical strength of the current collector so as to obtain a current collector having good mechanical stability, operating stability and service life, the tensile strength of the insulation layer is not smaller than 150 MPa. Further, in some embodiments, the tensile strength of the insulation layer may be in a range from 150 MPa to 400 MPa.

The testing method for the tensile strength is performed according to GB/T 1040.3-2006.

Further, in some embodiments, in addition to the higher tensile strength, the insulation layer also has good toughness, and its elongation at break is 16% to 120%.

The testing method for the elongation at break is as follows. The sample of the insulation layer is cut into a piece of 15 mm×200 mm. A high-speed puller is used to perform the tensile testing. An initial position is set, and a portion of the sample between clamps has a length of 50 mm, and stretching is performed at a speed of 50 mm/min. The device displacement y (mm) at the time of tensile break is recorded and the elongation at break is finally calculated as (y/50)× 100%.

It can be seen that when satisfying the above conditions, the tensile strength and the elongation at break of the insulation layer can further increase the overall strength of the current collector and reduce the thickness of the insulation layer while satisfying the supporting effect of the insulation layer.

When the insulation layer can sufficiently serve to support the conductive layer, the smaller thickness D1 of the insulation layer is better. However, a smaller thickness of the insulation layer might result in a smaller mechanical strength of the insulation layer, thereby causing the current collector to break during processing or using of the battery. Therefore, when the tensile strength of the insulation layer is not smaller than 150 MPa, it is preferable that 1 μm≤D1≤5 μm. Such an insulation layer can effectively reduce the weight and volume of the current collector, significantly increase the volume energy density of the current collector, and enable the current collector to have a good mechanical strength. More preferably, 1 μm≤D1≤3 μm.

The material of the insulation layer according to the embodiments of the present disclosure is an organic polymer insulation material selected from a group consisting of polyamide (abbreviated as PA), polyethylene terephthalate (abbreviated as PET), polyimide (abbreviated as PI), and polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, ethylene propylene rubber (abbreviated as PPE), polyformaldehyde (abbreviated as POM), phenol-formaldehyde resin, polytetrafluoroethylene (abbreviated as PTFE), silicone rubber, polyvinylidene fluoride (abbreviated as PVDF), polycarbonate (abbreviated as PC), or a combinations thereof.

Further, the thermal shrinkage at 200° C. of the insulation layer according to the embodiments of the present disclosure is not greater than 1.5%. Since the current collector is required to undergo processes such as drying, compaction and so on during processing of the electrode plate. Therefore, when the tensile strength of the insulation layer is not smaller than 200 MPa and the thermal shrinkage at 200° C. is not greater than 1.5%, the thickness of the insulation layer can be reduced substantially, even reduced to about 1 μm.

[Conductive Layer]

Compared with the conventional metal current collector, in the current collector according to the embodiments of the present disclosure, the conductive layer serves to conduct and collect current so as to provide electrons to the electrode active material layer. The thickness of the conductive layer is D2 satisfying: 200 nm≤D2≤1.5 μm, and the resistivity of the conductive layer is not greater than $8.0 \times 10^{-8}$ Ω·nm (at 20° C.). It can be seen from the thickness range that the ratio of the thickness of the conductive layer to the thickness of the insulation layer is from 1:50 to 1:5. Therefore, in the current collector according to the present disclosure, the conductive layer having a higher density accounts for a small portion, and thus the battery's weight energy density can be significantly improved.

Further, in some embodiments, a range of the resistivity of the conductive layer satisfies $1.6 \times 10^{-8}$ Ω·m to $8.0 \times 10^{-8}$ Ω·m (at 20° C.).

The resistivity of the conductive layer can be measured by a contact resistance measurement method. When the conductivity of the conductive layer is poor or the thickness of the conductive layer is too small, the internal resistance of the battery would be larger and the polarization would be larger. When the thickness of the conductive layer is too large, it cannot be sufficient to improve the weight energy density and volume energy density of the battery.

In the embodiments of the present disclosure, the upper limit of the thickness D2 of the conductive layer may be 1.5 μm, 1.4 μm, 1.3 μm, 1.2 μm, 1.1 μm, 1 μm, or 900 nm. The lower limit of the thickness D2 of the conductive layer may be 800 nm, 700 nm, 600 nm, 500 nm, 450 nm, 400 nm, 350 nm, 300 nm, or 200 nm. The thickness of the conductive layer D2 can be in a range of consisting of any one upper limit and any one lower limit.

Since the density of the conductive layer is greater than that of the insulation layer, the smaller thickness D2 of the conductive layer can facilitate reducing the weight of the current collector and improving the energy density of the battery. However, when D2 is too small, the effect of conducting and collecting current of the conductive layer would be deteriorated, thereby affecting the internal resistance, polarization, and cycle life of the battery. Therefore, when the resistivity of the conductive layer is not greater than $8.0 \times 10^{-8}$ Ω·m (at 20° C.), and 200 nm≤D2≤1 μm, the conductive layer can not only effectively reduce the weight of the current collector, but also make the battery have the better rate performance, charge and discharge performance, etc. More preferably, 200 nm≤D2≤900 nm.

In the current collector of the embodiments of the present disclosure, the bonding force between the insulation layer and the conductive layer is F satisfying ≥400 N/m.

The bonding force F was be measured as follows. A current collector in which a conductive layer is arranged on a surface of an insulation layer is used as a sample to be measured. Under room temperature and normal pressure conditions, 3M double-sided adhesive was evenly attached to a stainless steel plate, and then a test sample was evenly attached to the double-sided adhesive in a width of 2 cm. The conductive layer of the sample was peeled from the insulation layer by using a high-speed puller. The maximum pulling force was read according to a data chart of the pulling force and the displacement, and the read value is divided by 0.02 (unit N) to calculate the fastness of the metal layer, i.e., the bonding force F (N/m) between the insulation layer and the conductive layer of the current collector.

In the embodiments of the present disclosure, the bonding force between the insulation layer and the conductive layer of the current collector is larger than or equal to 400 N/m, so that a more firm and stable bond is formed between the insulation layer and the conductive layer and thus the insulation layer can play a better supporting role. Under the requirements of the range of the bonding force, the thickness of the insulation layer can be reduced to a maximum extent, and the supporting effect of the insulation layer can also be achieved, thereby further increasing the volume energy density of the battery.

In some embodiments, the material of the conductive layer is at least one of a metal conductive material and a carbon-based conductive material. The metal conductive material may be selected from at least one of aluminum, copper, nickel, titanium, silver, nickel-based alloy, aluminum-based alloy, and copper-based alloy. The carbon-based conductive material may be selected from at least one of graphite, acetylene black, graphene, and carbon nanotube.

The conductive layer can be formed on the insulation layer by means of at least one of mechanical rolling, bonding, vapor deposition, and electroless plating. The vapor deposition is preferably physical vapor deposition (PVD). Preferably, the physical vapor deposition is at least one of evaporation deposition and sputtering deposition. The evaporation deposition is preferably at least one of vacuum evaporation, thermal evaporation deposition, or electron beam evaporation method (EBEM). The sputtering deposition is preferably magnetron sputtering.

[Protective Layer]

When the thickness D2 of the conductive layer is small, it is susceptible to chemical corrosion or mechanical damage. Therefore, in the embodiments of the present disclosure, a protective layer is arranged on a surface of the conductive layer. The protective layer may be selected from a metal protective layer, a metal oxide protective layer or a conductive carbon protective layer.

The material of the metal protective layer is at least one of nickel, chromium, nickel-based alloy (e.g., a nickel-chromium alloy), and copper-based alloy (e.g., such as a nickel-copper alloy). The nickel-based alloy is an alloy formed by adding one or more other elements to a matrix of pure nickel. In some embodiments, in the nickel chromium alloy, the mass ratio of nickel element to chromium element is 1:99 to 99:1. The copper-based alloy is an alloy formed by adding one or more other elements to a matrix of pure copper. In some embodiments, in the nickel copper alloy, the mass ratio of nickel element to copper element is 1:99 to 99:1. The material of the metal oxide protective layer is at least one of aluminum oxide, cobalt oxide, chromium oxide, and nickel oxide. The material of the conductive carbon protective layer is at least one of conductive carbon black and carbon nanotube.

In the embodiments of the present disclosure, when the protective layer is arranged on a surface of the conductive layer facing away from the insulation layer, it is referred to as an upper protective layer. When the protective layer is arranged on a surface of the conductive layer facing towards the insulation layer, it is referred to as a lower protective layer. At least one of the upper protective layer and the lower protective layer is a metal protective layer, and the metal protective layer has the better conductivity and corrosion resistance than the metal oxide or conductive carbon, so that the rate performance, corrosion resistance, operating stability and service life of the current collector can be greatly improved.

Further, in some embodiments, the upper protective layer is a metal protective layer.

Further, in some embodiments, the metal protective layer is further selected from a metallic material having a hardness greater than that of the conductive layer, so that the mechanical strength of the current collector can be further enhanced. Preferably, the material of the metal protective layer can be selected from metallic nickel or nickel-based alloy because the metallic nickel or nickel-based alloy has good corrosion resistance, high hardness, and good conductivity.

As a further improvement of the current collector in the embodiments of the present disclosure, the thickness of the metal protective layer is D3 satisfying: 1 nm≤D3≤1 μm. If the metal protective layer is too thin, it is not enough to protect the conductive layer; and if the metal protective layer is too thick, the weight energy density and volume energy density of the battery may be reduced. Preferably, 5 nm≤D3≤500 nm, and more preferably 10 nm≤D3≤200 nm.

In some embodiments, the protective layer is located on the two opposite surfaces of the conductive layer, that is, the conductive layer is provided with both an upper protective layer and a lower protective layer. In this way, the operating stability and service life of the current collector can be improved to the utmost extent, and meanwhile, the capacity retention ratio, the cycle life, and the like of the battery can be improved.

The materials of the upper protective layer and the lower protective layer may be the same or different, and the thickness thereof may be the same or different.

Further, in some embodiments, the lower protective layer is a metal oxide protective layer. The lower protective layer can form a complete support structure to protect the conductive layer body, so as to better protect the conductive layer body, thereby preventing the conductive layer from being oxidized, corroded or damaged. Since the specific surface area of the metal oxide is larger, a bonding force between the lower protective layer made of the metal oxide and the insulation layer is enhanced. Meanwhile, since the specific surface area of the metal oxide is larger, the lower protective layer can increase roughness of the surface of the insulation layer, which have a function of enhancing the bonding force between the conductive layer and the insulation layer, such that the overall strength of the current collector can be enhanced.

The thickness of the metal oxide protective layer is D3' satisfying: D3'≤1/10 D2 and 1 nm≤D3'≤200 nm, preferably 10 nm≤D3'≤50 nm.

More preferably, the thickness of the upper protective layer is greater than that of the lower protective layer. That is, the thickness D3 of the metal protective layer is greater than the thickness D3' of the metal oxide protective layer, and preferably 1/2 D3≤D3'≤4/5 D3.

The protective layer can be formed on the conductive layer by means of vapor deposition, an in-situ formation method, a coating method, or the like. With respect to the vapor deposition, physical vapor deposition (PVD) is preferable. Preferably, the physical vapor deposition is at least one of evaporation deposition and sputtering deposition. The evaporation deposition is preferably at least one of vacuum evaporating, thermal evaporation deposition, electron beam evaporation method (EBEM). As regards the sputtering deposition, magnetron sputtering is preferable. The in-situ formation method is preferably an in-situ passivation method, i.e., a method for in-situ forming a metal oxide passivation layer on a metal surface. The coating method is preferably one of roll coating, extrusion coating, blade coating, gravure coating, and the like.

A second aspect of the embodiments of the present disclosure provides an electrode plate including the current collector of the first aspect of the embodiments of the present disclosure and an electrode active material layer formed on a surface of the current collector.

Figure 13:
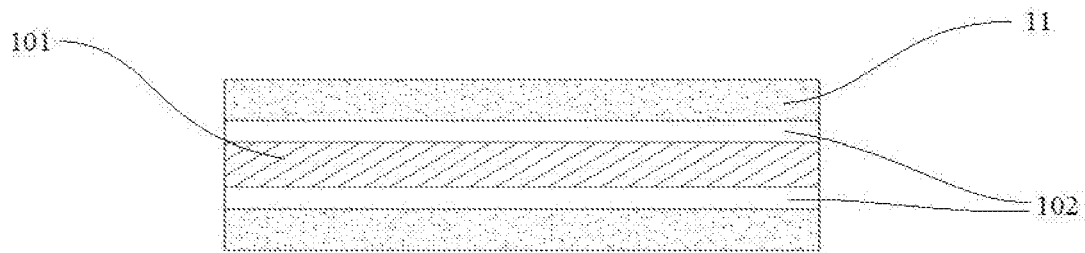
FIG. 13 is a structural schematic diagram of a positive electrode plate according to an embodiment of the present disclosure.
Figure 14:
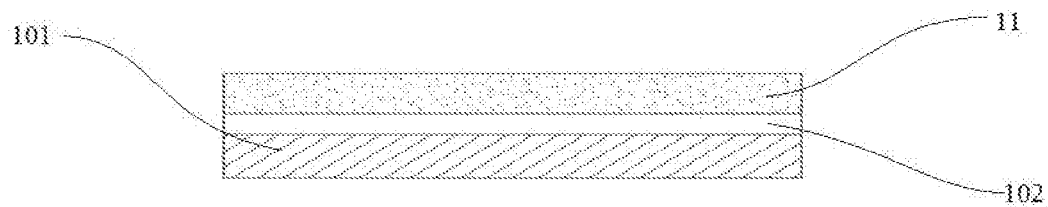
FIG. 14 is a structural schematic diagram of a positive electrode plate according to another embodiment of the present disclosure.

FIGS. 13 and 14 are structural schematic diagrams of a positive electrode plate according to an embodiment of the present disclosure. As shown in FIGS. 13 and 14, the positive electrode plate 1 includes the positive current collector 10 of the present disclosure and the positive active material layer 11 formed on the surface of the positive current collector 10. The positive current collector 10 includes a positive insulation layer 101 and a positive conductive layer 102.

Figure 15:
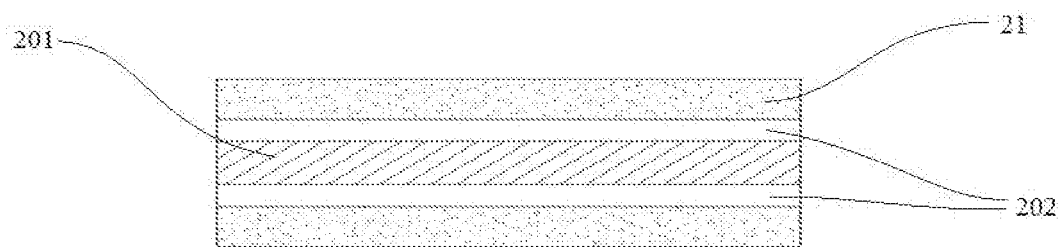
FIG. 15 is a structural schematic diagram of a negative electrode plate according to an embodiment of the present disclosure.
Figure 16:
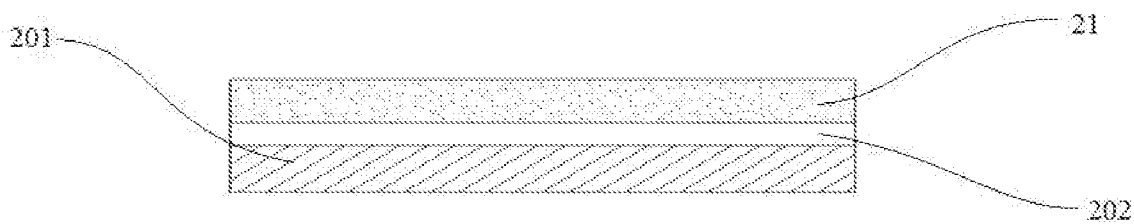
FIG. 16 is a structural schematic diagram of a negative electrode plate according to another embodiment of the present disclosure.

FIGS. 15 and 16 are structural schematic diagrams of a negative electrode plate according to an embodiment of the present disclosure. As shown in FIGS. 15 and 16, the negative electrode plate 2 includes the negative current collector 20 of the present disclosure and the negative active material layer formed on the surface of the negative current collector 20. The negative current collector 20 includes a negative insulation layer 201 and a negative conductive layer 202.

When each of the both sides of the insulation layer is provided with a conductive layer, the active material is coated on both sides of the current collector, so as to obtain the positive electrode plate and the negative electrode plate as shown in FIGS. 13 and 15, respectively. The positive and negative electrode plates can be directly applied in a battery. When only one side of the insulation layer is provided with a conductive layer, the active material is coated on one side of the current collector, so as to obtain the positive and negative electrode plates, as shown in FIG. 14 and FIG. 16, respectively. The positive and negative electrode plates can be applied in a battery after being bent.

The embodiments of the present disclosure further provide an electrochemical device including a positive electrode plate, a separator and a negative electrode plate.

The positive electrode plate and/or the negative electrode plate is the electrode plate of the above embodiments of the present disclosure. The electrochemical device according to the present disclosure can be of a wound type or laminated type. The electrochemical device according to the present disclosure can be one of a lithium-ion secondary battery, a lithium primary battery, a sodium ion battery, and a magnesium ion battery, but not limited to these.

Embodiments

1. Preparation of Current Collector

An insulation layer having a certain thickness is selected, and a conductive layer having a certain thickness is formed on the surface of the insulation layer by means of vacuum evaporation, mechanical rolling or bonding.

(1) The conditions of the vacuum evaporation are as follows: the insulation layer is placed in a vacuum evaporation chamber after a surface cleaning treatment, a high-purity metal wire in a metal evaporation chamber is melted and evaporated at a high temperature in a range of 1600° C. to 2000° C., the evaporated metal passes through a cooling system in the vacuum evaporation chamber and is finally deposited on the surface of the insulation layer to form the conductive layer. The bonding force F between the insulation layer and the conductive layer was measured to be 230 N/m by the above-described bonding force test method.

(2) The conditions of the mechanical rolling are as follows: a foil of a material used for the conductive layer is placed in a mechanical roller, rolled to a predetermined thickness by applying a pressure in a range of 20 t to 40 t, and then placed on a surface of the insulation layer that has been subjected to a surface cleaning treatment, and finally the both are placed in the mechanical roller, so as to be tightly bonded by applying a pressure in a range of 30 t to 50 t. The bonding force F between the insulation layer and the conductive layer was measured to be 160 N/m by the above-described bonding force test method.

(3) The conditions of the bonding are as follows: a foil of a material used for the conductive layer is placed in a mechanical roller, rolled to a predetermined thickness by applying a pressure in a range of 20 t to 40 t, and then a mixed solution of PVDF and NMP is applied on a surface of the insulation layer that has been subjected to a surface cleaning treatment, and finally the conductive layer having the above predetermined thickness is bonded to the surface of the insulation layer and dried at 100° C. The bonding force F between the insulation layer and the conductive layer was measured to be 180 N/m by the above-described bonding force test method.

Aluminum is selected as the material of the conductive layer of the positive current collector, and copper is selected as the material of the conductive layer of the negative current collector. When aluminum or copper is selected, the resistivity of the conductive layer satisfies being not greater than $8.0 \times 10^{-8}$ Ω·cm (at 20° C.).

The insulation layer in the embodiments of the present disclosure is made of a material having tensile strength not smaller than 150 MPa, elongation at break of 16% to 120% and heat shrinkage at 200° C. not greater than 1.5%, for example, the marketed materials of PET or PI satisfying such requirements. The composition and thickness of the current collector in the examples and comparative examples of the present disclosure are shown in Table 1. The conventional positive current collector is an aluminum foil of 12 μm, and the conventional negative current collector is a copper foil of 8 μm.

In Table 1, for the positive current collector, a weight percentage of the current collector refers to a ratio of a weight per unit area of the positive current collector to a weight per unit area of the conventional positive current collector. For the negative current collector, a weight percentage of the current collector refers to a ratio of a weight per unit area of the negative current collector to a weight per unit area of the conventional negative current collector.

2. Preparation of Collector Having Protective Layer

There are several manners to form a current collector having a protective layer as follows.

(1) A protective layer is firstly arranged on a surface of the insulation layer by means of vapor deposition or coating, and then a conductive layer having a certain thickness is formed on the protective layer disposed on the insulation layer by means of vacuum evaporation, mechanical rolling or bonding, so as to prepare a current collector having a protective layer (the protective layer is located between the insulation layer and the conductive layer). In addition, alternatively, on the basis of the above, another protective layer is further formed on a surface of the conductive layer facing away from the insulation layer by means of vapor deposition, in-situ formation or coating, so as to prepare a current collector having the protective layers (which are located on two opposite surfaces of the conductive layer).

(2) A protective layer is firstly formed on a surface of the conductive layer by means of vapor deposition, in-situ formation, or coating, and then the conductive layer provided with the above protective layer is arranged on a surface of the insulation layer by means of mechanical rolling or bonding, and the protective layer is arranged between the insulation layer and the conductive layer, so as to prepare a current collector having a protective layer (the protective layer is located between the insulation layer and the conductive layer). In addition, alternatively, on the basis of the above, another protective layer is further formed on a surface of the conductive layer away from the insulation layer by means of vapor deposition method, in-situ formation, or coating, so as to prepare a current collector having the protective layers (which are located on two opposite surfaces of the conductive layer).

(3) A protective layer is firstly formed on a surface of the conductive layer by means of vapor deposition, in-situ formation, or coating, and then the conductive layer provided with the above protective layer is arranged on a surface of the insulation layer by means of mechanical rolling or bonding, and the protective layer is arranged on a surface of the conductive layer away from the insulation layer, so as to prepare a current collector having an protective layer (which is located on the surface of the conductive layer facing away from the insulation layer).

(4) A protective layer is firstly formed on two surfaces of the conductive layer by means of vapor deposition, in-situ formation, or coating, and then the conductive layer provided with the above protective layer is arranged on the surface of the insulation layer by means of mechanical rolling or bonding, so as to prepare a current collector having the protective layers (which are located on two opposite surfaces of the conductive layer).

(5) On the basis of "Preparation of Current Collector" of Embodiment 1 above, moreover, another protective layer is formed on the surface of the conductive layer away from the insulation layer by means of vapor deposition, in-situ formation, or coating, so as to prepare a current collector having the protective layer (which is located on the surface of the conductive layer facing away from the insulation layer).

In the embodiments of preparation, the vapor deposition is vacuum evaporation, the in-situ formation is in-situ passivation, and the coating is blade coating.

The conditions of the vacuum evaporation are as follows: a sample is placed in a vacuum evaporation chamber after a surface cleaning treatment, a material of the protective layer in the evaporation chamber is melted and evaporated at a high temperature in a range of 1600° C. to 2000° C., and the evaporated material of the protective layer passes through a cooling system in the vacuum evaporation chamber and is finally deposited on a surface of the sample, so as to form the protective layer.

The conditions of the in-situ passivation are as follows: the conductive layer is placed in a high-temperature oxidizing environment, the temperature is controlled within a range of 160° C. to 250° C., and the oxygen supply is maintained in the high-temperature environment, and processing time is 30 min, so as to form a protective layer of metal oxide.

The conditions of the gravure coating are as follows: a material of the protective layer and NMP are stirred and mixed, then the slurry of the above material of the protective layer (solid material content is 20% to 75%) is coated on a surface of the sample, the thickness of the coating is controlled by a gravure roll, and finally the coating is dried at 100 to 130° C.

The specific parameters of the obtained collector having the protective layer and its electrode plates are shown in Table 2.

3. Preparation of Electrode Plate

A slurry of a positive active material (NCM) was coated on the surface of the positive current collector by a conventional battery coating process, and dried at 100° C. to obtain a positive electrode plate having the same compaction density (compaction density: 3.4 g/cm$^3$). The active material layer has a thickness of 55 μm.

A slurry of a negative active material (graphite) was coated on the surface of the negative current collector by a conventional battery coating process, and was dried at 100° C. to obtain a negative electrode plate having the same compaction density (compaction density: 1.6 g/cm$^3$). The negative active material layer has a thickness of 70 μm.

Conventional positive electrode plate: the current collector is an Al foil having a thickness of 12 μm, and the electrode active material layer is a layer of the positive active material (NCM or LCO) having a certain thickness.

Conventional negative electrode plate: the current collector is a Cu foil having a thickness of 8 μm, and the electrode active material layer is a graphite material layer having a certain thickness.

The specific parameters of the electrode plates of the examples and comparative examples of the present disclosure are shown in Table 1 and Table 2.

4. Preparation of the Battery:

A positive electrode plate (compaction density: 3.4 g/cm), a PP/PE/PP separator and a negative electrode plate (compaction density: 1.6 g/cm$^3$) are wound together to form a bare cell by a conventional battery manufacturing process, then the bare cell is placed into a battery case, an electrolyte (EC: EMC in a volume ratio of 3:7; LiPF6, 1 mol/L) is injected into the case, followed by sealing, formation, and the like, so as to obtain a lithium ion secondary battery (hereinafter referred to as battery).

Specific compositions of the battery prepared in the embodiments of the present disclosure and the batteries of the comparative examples are shown in Table 3.

TABLE 1

| Electrode plate No. | Current collector No. | Insulation layer Material | D1 | Conductive layer Material | D2 | Thickness of current collector | Weight percent of current collector |
|---|---|---|---|---|---|---|---|
| Electrode plate 1# | Positive current collector 1# | PET | 10 μm | Al | 500 nm | 11 μm | 48.3% |
| Electrode plate 2# | Positive current collector 2# | PI | 6 μm | Al | 300 nm | 6.6 μm | 30.0% |
| Electrode plate 3# | Positive current collector 3# | PI | 5 μm | Al | 1.5 μm | 8 μm | 45.8% |
| Electrode plate 4# | Positive current collector 4# | PET | 4 μm | Al | 900 nm | 5.8 μm | 31.0% |
| Electrode plate 5# | Positive current collector 5# | PI | 3 μm | Al | 200 nm | 3.4 μm | 15.8% |
| Electrode plate 6# | Positive current collector 6# | PI | 1 μm | Al | 400 nm | 1.8 μm | 10.9% |
| Conventional electrode plate | Conventional positive current collector | / | / | Al | / | 12 μm | 100% |
| Negative electrode plate 1# | Negative current collector 1# | PET | 8 μm | Ni | 1 μm | 10 μm | 39.6% |
| Negative electrode plate 2# | Negative current collector 2# | PI | 2 μm | Cu | 800 nm | 3.6 μm | 23.8% |
| Conventional negative electrode plate | Conventional negative current collector | / | / | Cu | / | 8 μm | 100% |

TABLE 2

| Electrode plate No. | Current collector No. | Lower protective layer Material | D3/D3' | Upper protective layer Material | D3 |
|---|---|---|---|---|---|
| Positive electrode plate 3-1# | Positive current collector 3-1# | / | / | Nickel | 1 nm |
| Positive electrode plate 3-2# | Positive current collector 3-2# | / | / | Nickel | 10 nm |
| Positive electrode plate 3-3# | Positive current collector 3-3# | / | / | Nichrome | 50 nm |
| Positive electrode plate 3-4# | Positive current collector 3-4# | / | / | Nickel | 200 nm |
| Positive electrode plate 3-5# | Positive current collector 3-5# | Nickel | 5 nm | / | / |
| Positive electrode plate 3-6# | Positive current collector 3-6# | Nickel | 100 nm | / | / |
| Positive electrode plate 3-7# | Positive current collector 3-7# | Nickel oxide | 5 nm | Nickel | 10 nm |
| Positive electrode plate 3-8# | Positive current collector 3-8# | Nickel oxide | 10 nm | Nickel | 10 nm |
| Positive electrode plate 3-9# | Positive current collector 3-9# | Nickel oxide | 50 nm | Nichrome | 50 nm |
| Positive electrode plate 3-10# | Positive current collector 3-10# | Nickel oxide | 100 nm | Nichrome | 50 nm |
| Positive electrode plate 3-11# | Positive current collector 3-11# | Nickel oxide | 200 nm | Nickel | 100 nm |

The lower protective layers of the positive electrode plate 3-5 # and the positive electrode plate 3-6 # are metal protective layers having a thickness of D3. The lower protective layers of the positive electrode plate 3-7 # to 3-11 # are a metal oxide protective layer having a thickness of D3'. The upper protective layers of the positive electrode plates 3-1 # to 3-4 # and the positive electrode plates 3-7 # to 3-11 # are metal protective layers having a thickness of D3. "/" indicates that no protective layer is provided. The nickel-based alloy is an alloy formed by nickel and chromium in a mass ratio of 9:1.

TABLE 3

| Battery No. | Composition of the electrode plate | |
|---|---|---|
| Battery 1# | Conventional positive electrode plate | Conventional negative electrode plate |
| Battery 2# | Positive electrode plate 1# | Conventional negative electrode plate |
| Battery 3# | Positive electrode plate 2# | Conventional negative electrode plate |
| Battery 4# | Positive electrode plate 3# | Conventional negative electrode plate |
| Battery 5# | Positive electrode plate 4# | Conventional negative electrode plate |
| Battery 6# | Positive electrode plate 5# | Conventional negative electrode plate |
| Battery 7# | Conventional positive electrode plate | Negative electrode plate1# |
| Battery 8# | Positive electrode plate 3-1# | Conventional negative electrode plate |
| Battery 9# | Positive electrode plate 3-2# | Conventional negative electrode plate |
| Battery 10# | Positive electrode plate 3-3# | Conventional negative electrode plate |
| Battery 11# | Positive electrode plate 3-4# | Conventional negative electrode plate |
| Battery 12# | Positive electrode plate 3-5# | Conventional negative electrode plate |
| Battery 13# | Positive electrode plate 3-6# | Conventional negative electrode plate |
| Battery 14# | Positive electrode plate 3-7# | Conventional negative electrode plate |
| Battery 15# | Positive electrode plate 3-8# | Conventional negative electrode plate |
| Battery 16# | Positive electrode plate 3-9# | Conventional negative electrode plate |
| Battery 17# | Positive electrode plate 3-10# | Conventional negative electrode plate |
| Battery 18# | Positive electrode plate 3-11# | Conventional negative electrode plate |

Experimental Examples

1. Test Method of the Batteries:

A method for testing cycle life of the lithium ion battery was performed as follows.

A lithium ion battery was charged and discharged at 251° C. and 45° C. respectively, that is, it was firstly charged with a current of 1 C to a voltage of 4.2V, then discharged with a current of 1 C to a voltage of 2.8V, and the discharge capacity after a first cycle was recorded; and the battery was subjected to 1000 cycles of 1 C/1 C charging-discharging, and the discharge capacity of the battery after a $1000^{th}$ cycle was recorded. A capacity retention rate after the 10000 cycle was obtained by dividing the discharge capacity after the $1000^{th}$ cycle by the discharge capacity after the first cycle.

The experimental results are shown in Table 4.

2. Rate Experiment

A rate experiment was performed for the lithium ion battery. The specific test method was performed as follows.

The lithium ion battery was charged and discharged at 25° C., i.e., the battery was firstly charged with a current of 1 C to a voltage of 4.2V, and then was discharged with a current of 1 C to a voltage of 2.8V. The discharge capacity after the first cycle was recorded and divided by the discharge capacity at 25° C. with 1 C/1 C charge-discharge after the first cycle to obtain a 4 C rate performance of the battery.

The experimental results are shown in Table 4.

TABLE 4

| Battery No. | Capacity retention ratio after the $1000^{th}$ cycle at 45° C. | 4 C rate performance |
|---|---|---|
| Battery 1# | 86.4% | 46.1% |
| Battery 2# | 85.1% | 45.2% |
| Battery 3# | 84.3% | 44.3% |
| Battery 4# | 85.8% | 45.9% |
| Battery 5# | 84.6% | 44.5% |
| Battery 6# | 84.9% | 44.8% |
| Battery 7# | 85.6% | 45.6% |
| Battery 8# | 86.0% | 45.8% |
| Battery 9# | 86.3% | 46.0% |
| Battery 10# | 86.5% | 46.3% |
| Battery 11# | 87.2% | 46.8% |
| Battery 12# | 86.2% | 45.9% |
| Battery 13# | 86.8% | 46.5% |
| Battery 14# | 86.6% | 46.2% |
| Battery 15# | 86.2% | 46.3% |
| Battery 16# | 86.7% | 46.6% |
| Battery 17# | 87.8% | 47.8% |
| Battery 18# | 88.9% | 48.7% |

It can be seen from Tables 1 and 2 that the weight is greatly reduced by using the positive electrode collector and the negative current collector of the present disclosure. In the condition where the tensile strength and elongation at break of the current collector meet the use requirements, the weight percentage of the positive current collector is 50% or smaller of the conventional positive current collector, and the weight percentage of the negative current collector is 40% or smaller of the conventional negative current collector.

According to the results in Table 4, compared with Battery 1 # using the conventional positive electrode plate and the conventional negative electrode plate, the battery using the current collector according to the embodiments of the present disclosure has good cycle performance, which is equivalent to the cycle performance of the conventional battery. This shows that the current collectors according to the embodiments of the present disclosure do not have any significant adverse effects on the resulting electrode plates and batteries. In particular, the battery prepared by the current collector provided with the protective layer can have a further improved capacity retention rate, indicating a better reliability of the battery.

Although the present disclosure is disclosed with the preferred embodiments as above, it is not intended to limit the claims. Any person skilled in the art can make some possible changes and modifications without departing from the concept of the present disclosure. Therefore, the protection scope of the present disclosure shall be defined by the scope of the claims in this application.

What is claimed is:

1. A current collector, comprising: an insulation layer and at least one conductive layer, wherein the insulation layer is used to support the conductive layer, and the at least one conductive layer is used to support an electrode active material layer and is located above at least one surface of the insulation layer,
    wherein the insulation layer has a density smaller than a density of the conductive layer,
    wherein a metal protective layer is arranged on at least one surface of each of the at least one conductive layer,
    wherein the metal protective layer is arranged on a surface of one conductive layer of the at least one conductive layer facing away from the insulation layer,
    wherein a metal oxide protective layer is arranged on a surface of the one conductive layer of the at least one conductive layer facing towards the insulation layer,
    wherein the insulation layer has a thermal shrinkage at 200° C. of smaller than or equal to 1.5%, and the insulation layer has an elongation at break of 16% to 120%, and
    a bonding force between the insulation layer and the at least one conductive layer is F, and F≥400 N/m.

2. The current collector according to claim 1, wherein the conductive layer has a thickness of D2 satisfying: 200 nm≤D2≤1.5 μm,
    wherein the conductive layer has a resistivity smaller than or equal to $8.0 \times 10^{-8}$ Ω·m.

3. The current collector according to claim 2, wherein the metal protective layer has a thickness of D3, and D3≤1/10 D2 and 1 nm≤D3≤200 nm.

4. The current collector according to claim 2, wherein the metal protective layer has a thickness of D3 and the metal oxide protective layer has a thickness of D3' satisfying: D3'≤1/10 D2, 1 nm≤D3'≤200 nm, D3>D3', 1/2 D3≤D3'≤4/5 D3.

5. The current collector according to claim 1, wherein the insulation layer has a thickness of D1 satisfying: 1 μm≤D1≤10 μm,
    wherein the insulation layer has a tensile strength greater than or equal to 150 MPa.

6. The current collector according to claim 1, wherein the metal protective layer is made of a material selected from a group consisting of nickel, chromium, nickel-based alloy, and copper-based alloy, or combinations thereof.

7. The current collector according to claim 1, wherein the insulation layer has a thickness of D1 satisfying: 1 μm≤D1≤5 μm.

8. An electrode plate, comprising: a current collector and an electrode active material layer formed on a surface of the current collector,
    wherein current collector comprises: an insulation layer and at least one conductive layer, wherein the insulation layer is used to support the conductive layer, and the at least one conductive layer is used to support the electrode active material layer and is located above at least one surface of the insulation layer,
    wherein the insulation layer has a density smaller than a density of the conductive layer, wherein a metal protective layer is arranged on at least one surface of each of the at least one conductive layer, wherein the metal protective layer is arranged on a surface of one conductive layer of the at least one conductive layer facing away from the insulation layer, wherein a metal oxide protective layer is arranged on a surface of the one conductive layer of the at least one conductive layer facing towards the insulation layer, and wherein the insulation layer has a thermal shrinkage at 200° C. of smaller than or equal to 1.5%, and the insulation layer has an elongation at break of 16% to 120%, and a bonding force between the insulation layer and the at least one conductive layer is F, and F≥400 N/m.

9. The electrode plate according to claim 8, wherein the conductive layer has a thickness of D2 satisfying: 200 nm≤D2≤1.5 μm, wherein the conductive layer has a resistivity smaller than or equal to $8.0 \times 10^{-8}$ Ω·m.

10. The electrode plate according to claim 8, wherein the insulation layer has a thickness of D1 satisfying: 1 μm≤D1≤10 μm, wherein the insulation layer has a tensile strength greater than or equal to 150 MPa.

11. The electrode plate according to claim 8, wherein the metal protective layer is made of a material selected from a group consisting of nickel, chromium, nickel-based alloy, and copper-based alloy, or combinations thereof.

12. An electrochemical device, comprising: a positive electrode plate, a separator, and a negative electrode plate, wherein the positive electrode plate and/or the negative electrode plate is an electrode plate, wherein the electrode plate comprises: a current collector and an electrode active material layer formed on a surface of the current collector, wherein current collector comprises: an insulation layer and at least one conductive layer, wherein the insulation layer is used to support the conductive layer, and the at least one conductive layer is used to support the electrode active material layer and is located above at least one surface of the insulation layer, wherein the insulation layer has a density smaller than a density of the conductive layer, wherein a metal protective layer is arranged on at least one surface of each of the at least one conductive layer, wherein the metal protective is arranged on a surface of one conductive layer of the at least one conductive layer facing away from the insulation layer, wherein a metal oxide protective layer is arranged on a surface of the one conductive layer of the at least one conductive layer facing towards the insulation layer, and wherein the insulation layer has a thermal shrinkage at 200° C. of smaller than or equal to 1.5%, and the insulation layer has an elongation at break of 16% to 120%, and a bonding force between the insulation layer and the at least one conductive layer is F, and F≥400 N/m.

13. The electrochemical device according to claim 12, wherein the conductive layer has a thickness of D2 satisfying: 200 nm≤D2≤1.5 μm, wherein the conductive layer has a resistivity smaller than or equal to $8.0 \times 10^{-8}$ Ω·m.

14. The electrochemical device according to claim 12, wherein the insulation layer has a thickness of D1 satisfying: 1 μm≤D1≤10 μm, wherein the insulation layer has a tensile strength greater than or equal to 150 MPa.

15. The electrochemical device according to claim 12, wherein the metal protective layer is made of a material selected from a group consisting of nickel, chromium, nickel-based alloy, and copper-based alloy, or combinations thereof.

* * * * *